Patented Aug. 25, 1953

2,649,918

UNITED STATES PATENT OFFICE 2,649,918

PHARMACEUTICAL PREPARATIONS

Joseph B. Miller, Mobile, Ala.

No Drawing. Application August 12, 1949,
Serial No. 110,040

2 Claims. (Cl. 167—58)

This invention relates primarily to a pharmaceutical preparation for treating humans suffering from pulmonary tuberculosis.

The object of the invention is to provide a pharmaceutical preparation which may be administered by physicians, or under their direction, to patients suffering from pulmonary tuberculosis and a technique for administering such preparation during the course of the extended treatments required to treat such disease.

Streptomycin has been found to be effective in the treatment of certain types of human tuberculosis. Physicians, working in the human tubercular field, have reported that tubercle bacilli develop resistance to usual blood levels (10 units per cc.) of streptomycin, gradually developing the phenomenon of being able to live in the presence of such usual doses of streptomycin. Bacilli having become resistant to such treatment, it therefore becomes necessary, in order to inhibit growth of such bacilli, to increase the dosages to obtain blood levels at times up to a thousand units per cc. or even higher. It has been found impossible to obtain the above mentioned extremely high levels of streptomycin at the site of infection by simple intra-muscular injection and it is regarded as unsafe practice to inject streptomycin intramuscularly when such injections result in a prolonged blood level of over 20 units per cc.

It has been determined that when streptomycin contacts the caseous, lipid exudate present in the lungs of persons suffering from some forms of pulmonary tuberculosis, the streptomycin loses much of its efficiency for destroying the tubercular bacilli. This is partially due to the highly lipid nature of caseous exudate, coupled with the fact that streptomycin is not soluble in lipids. Another retardent to the efficient use of streptomycin resides in the fact that each bacillus has a waxy capsule or covering which partially prevents the entrance of streptomycin into the bacilli and the bacilli are contained within the masses of caseous matter and by reason thereof it is difficult to bring the streptomycin into killing contact with the bacilli.

It has been further determined by investigators that the caseous exudate is highly acid and when streptomycin, which is base, comes in contact therewith, it is inactivated.

These several problems have been solved by this invention.

A balanced solution of a dispersing agent, a buffer, glycerine and water is prepared in which streptomycin is dissolved, utilizing 5 cc. of the balanced solution to each gram of streptomycin.

As an example to illustrate the invention, the balanced solution may be prepared as follows:

0.1% of alkylated aryl polyether alcohol, preferably that known in the trade as Triton A-20, is mixed with 2.0% glycerine and 1.0% of bicarbonate of soda and the balance distilled water (all by volume). The solution is tested and if its pH varies substantially from 8.0, it should be adjusted to 8.0 pH. 5 cc. of such balanced solution is utilized to dissolve each gram of streptomycin, the streptomycin readily dissolving in this solution. The preparation is administered to the patient by the use of a nebulizer, the mist therefrom being inhaled by mouth. A dose consists of 5 cc. of the preparation administered twice a day. A single dose (that is, one gram of streptomycin in 5 cc. of the balanced solution) should be administered continuously over a period of about 40–45 minutes. The administration of the preparation in the form of an inhaled mist causes distribution thereof in the lungs and brings the preparation into contact with the masses of caseous matter. The buffer present in the preparation changes the acid condition of the caseous matter to alkaline, a medium in which the streptomycin does not lose its efficiency. The Triton A-20 acts as a dispersing agent, not only dispersing and emulsifying the caseous material, but also dispersing the individual tubercle bacilli and reducing the surface tension of the waxy capsules around the individual bacilli. This waxy capsule is acted upon by the balanced solution and its character affected, exposing the bacilli to access by the streptomycin. Inasmuch as the caseous material is rendered alkaline, is dispersed and emulsified and the bacilli are dispersed, the streptomycin in solution in the water of the balanced solution can readily contact the bacilli and destroy them or inhibit their multiplication.

Other alkylated aryl polyether alcohols which may be used in the balanced solution are the Tritons known as X-30, X-45, X-100, X-120, X-155, X-166 and C-50. A process for the manufacture of Triton A-20 and other like compounds is set forth in U. S. Patent 2,454,541 to Bock et al. Such agents are not hydrolyzed by the enzymes of the lung fluids. In the selection of a dispersing agent only such should be utilized as will not be so hydrolyzed in the lung fluids. In place of bicarbonate of soda other buffers may be used, such as sodium acid phosphate titrated with sodium hydroxide, the latter being added until the balanced solution has a pH of substantially 8.0.

Glycerine may be omitted, its use being primarily to stabilize the mist issuing from the nebulizer.

The balanced solution is in itself non-toxic and the streptomycin prepared according to this invention and administered as a mist into the lungs is very slowly absorbed by the blood and its blood level is much lower than that resulting from injecting equal amounts of streptomycin intramuscularly. The lungs retain the streptomycin for many hours (of the order of 16 hours) releasing it only slowly into the blood stream and never resulting in toxic blood levels. The concentration of streptomycin which may be used according to this invention may be many times higher than safely obtainable by intramuscular injection and when inhaled by the mouth is effective against the most resistant bacilli. It may be administered at a concentration of 200,000 units per cc., or a total of 1,000,000 units in 5 cc. of the balanced solution. The preparation of this invention is preferably administered as a nebulized mist by mouth, but it may be injected into the tubercular empyema cavities, or other accessible lesions.

In the foregoing specification, illustrated in this invention, the proportions of the ingredients and the conditions under which the best results may be obtained, have been set forth in detail. It is to be understood, however, that the invention is not limited to these specific details. Thus, for instance, the percentage of the alkylated aryl polyether alcohol may be decreased or increased over the proportion given inasmuch as such compounds are not toxic, but rather have an inhibiting effect upon the multiplication of the bacilli. In like manner, the pH of the balanced solution may be less than 8.0 as long as it is maintained on the alkaline side or may be increased over 8.0 up to substantially 9.0 without departing from this invention. It has been explained that the glycerine may be omitted entirely.

The preparation set out in detail in the specification is particularly advantageous in the treatment of cases of pulmonary tuberculosis of long standing and high resistance, and also in cases where caseous matter is present in the lungs. One gram of streptomycin dissolved in the balanced solution is considered a massive dose, but by the method of administration the patient actually does not retain the full gram, inasmuch as inhalation and exhalation causes a loss of some of the active ingredients, as well as of the balanced solution, being dispersed in the atmosphere during nebulization and exhalation.

Other preparations may be prepared, in the judgment of the medical specialist, containing smaller amounts of streptomycin ranging from 5,000 units (there being 1,000,000 units to the gram of streptomycin) to 5 cc. of balanced solution up to the maximum of 1 gram to 5 cc. of balanced solution. The medical practitioner will determine the strength of the solution based upon his study of each particular case and his determination from such study as to how he desires to treat the particular patient. The pharmaceutical manufacturer, under some conditions, may find it advantageous to put up the balanced solution in containers in given amounts, separate from the streptomycin, in order that the physician may prepare the desired strength for each particular case.

Other materials, such as mucolytic enzymes, may be added to further increase the ability of the streptomycin to penetrate the body tissues as well as the tubercle bacillus. The usual dose is up to approximately 40 units per cc. of balanced solution.

I claim:

1. A balanced aqueous streptomycin solution nebulizable to an aerosol for nebulizing streptomycin dissolved therein, said solution containing as its principal active ingredient streptomycin concentrations exceeding 5,000 units for each 5 cc. of solution and being buffered to a pH of approximately 8 and containing glycerin in quantity to stabilize the particle size of the mist nebulized therefrom for optimum distribution thereof in the lungs and further containing approximately 0.1% of an alkylated aryl polyether alcohol to enhance the penetration of the nebulized liquid in the treatment of caseous pulmonary tuberculosis of humans.

2. A balanced aqueous streptomycin solution nebulizable to an aerosol for use in the treatment of caseous pulmonary tuberculosis of humans consisting essentially of 5,000 to 1,000,000 units of streptomycin dissolved in 5 cc. of solution the balance of said streptomycin solution consisting essentially of approximately 2% of glycerin in water to stabilize the particle size of the mist nebulized therefrom for optimum distribution in the lungs, said solution further containing 0.1% of alkylated aryl polyether alcohol and a small quantity of alkali buffering agent buffering said solution to a pH of approximately 8.

JOSEPH B. MILLER.

References Cited in the file of this patent

Bryson and Grace, "Aerosol Therapy of Respiratory Disease." The New England Journal of Medicine, November 6, 1947, Number 19, volume 237, pages 683 to 692.

Journal American Pharmaceutical Association, Sci. ed., November 1945, page 281.

Drug and Cosmetic Industry, January 1949, page 99.

Drug and Cosmetic Industry, February 1949, pages 167, 168, 248 to 252.

Proc. Soc. Exptl. Biol. & Med., May 1947, page 18.

J. Investigative Dermatology, January 1947, pages 27 to 29.